United States Patent
Filsfils et al.

(10) Patent No.: US 7,684,316 B2
(45) Date of Patent: Mar. 23, 2010

(54) MULTICAST FAST REROUTE FOR NETWORK TOPOLOGIES

(75) Inventors: Clarence Filsfils, Brussels (BE);
Gregory Shepherd, Eugene, OR (US);
Apoorva Karan, San Jose, CA (US);
John M. Zwiebel, Santa Cruz, CA (US);
Dino Farinacci, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 205 days.

(21) Appl. No.: 12/069,709

(22) Filed: Feb. 12, 2008

(65) Prior Publication Data

US 2009/0201803 A1    Aug. 13, 2009

(51) Int. Cl.
*G06F 11/00* (2006.01)
*H04L 12/26* (2006.01)
(52) U.S. Cl. .................. 370/222; 370/229; 370/254
(58) Field of Classification Search .............. None
See application file for complete search history.

(56) References Cited

U.S. PATENT DOCUMENTS

| 6,418,139 | B1* | 7/2002 | Akhtar | 370/356 |
| 7,230,924 | B2* | 6/2007 | Chiu et al. | 370/237 |
| 7,477,593 | B2* | 1/2009 | Scudder et al. | 370/217 |
| 7,545,735 | B1* | 6/2009 | Shabtay et al. | 370/217 |
| 7,551,551 | B2* | 6/2009 | Filsfils et al. | 370/219 |
| 2006/0159009 | A1* | 7/2006 | Kim et al. | 370/216 |
| 2006/0176894 | A1* | 8/2006 | Oh et al. | 370/413 |
| 2007/0121486 | A1* | 5/2007 | Guichard et al. | 370/216 |
| 2007/0253416 | A1* | 11/2007 | Raj | 370/390 |
| 2008/0025227 | A1* | 1/2008 | Puttu et al. | 370/244 |
| 2008/0031130 | A1* | 2/2008 | Raj et al. | 370/225 |

OTHER PUBLICATIONS

IPriori 6.2 Carrier-Class Software System, Avici Systems, 2004.
Holbrook et al., "IP Multicast Channels: Express Support for Large-scale Single-source Applications", Department of Computer Science, Stanford University, 1999.

* cited by examiner

*Primary Examiner*—Chi H Pham
*Assistant Examiner*—Soon-Dong D Hyun
(74) *Attorney, Agent, or Firm*—Cindy Kaplan

(57) ABSTRACT

In one embodiment, a method includes receiving a multicast join message at a node having a plurality of interfaces, identifying the interface at which the join message was received, and selecting one or more of the interfaces to transmit the join message based on whether the join message was received on a ring interface. If the join message was received on one of the ring interfaces, the join message is transmitted on another of the interfaces. If the join message was not received on one of the ring interfaces, the join message is transmitted on both of the ring interfaces. The method further includes receiving multicast data and transmitting the multicast data on the interface at which the join message was received.

20 Claims, 15 Drawing Sheets

US 7,684,316 B2

MULTICAST FAST REROUTE FOR NETWORK TOPOLOGIES

BACKGROUND OF THE INVENTION

The present disclosure relates generally to maintaining multicast data flow in the event of a network failure.

Traditional Internet Protocol (IP) communication allows a host to send packets to a single host (unicast transmission) or to all hosts (broadcast transmission). To support a demand to provide applications such as audio and video conference calls, audio broadcasting, and video broadcasting that involve high data rate transmission to multiple hosts, a third routing technique has evolved, multicast routing. In multicast routing, a host sends packets to a subset of all hosts as a group transmission. Multicast routing protocols have been developed to conserve bandwidth by minimizing duplication of packets. To achieve maximum efficiency delivery of data, rather than being replicated at the source, multicast packets are replicated in a network at the point where paths to multiple receivers diverge.

Conventional multicast routing systems depend on unicast routing protocols to detect a network failure. Redirection of impacted traffic does not occur until after the network failure has been identified by the unicast routing protocol and a new path has been established. In many cases, such as video applications that require near-zero packet loss, this impacts network performance during failure recovery. One approach to overcome this performance degradation is to provide source redundancy in which separate multicast hosts are provisioned and located in the network to achieve diverse paths. However, this requires the use of multiple hosts and synchronization of data streams. Also, the source redundancy model results in a significant waste of bandwidth.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1A:
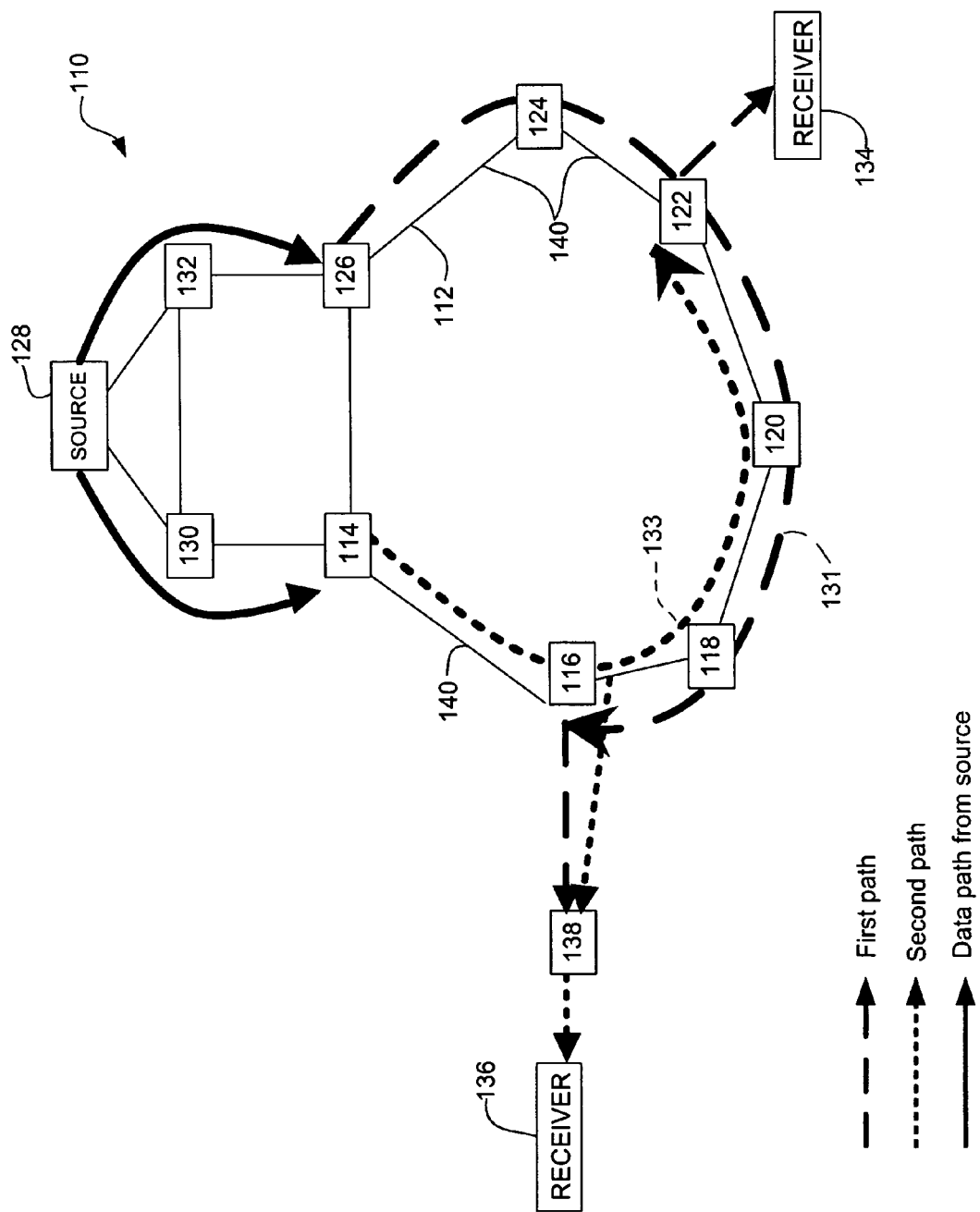
FIG. 1A illustrates an example of a network with a ring topology, in which embodiments described herein may be implemented.

A method and apparatus for fast reroute of multicast data are disclosed. In one embodiment, a method generally comprises receiving a multicast join message at a node having a plurality of interfaces including at least two ring interfaces, identifying the interface at which the multicast join message was received, and selecting one or more of the interfaces to transmit the multicast join message based on whether the multicast join message was received on one of the ring interfaces. If the multicast join message was received on one of the ring interfaces, the multicast join message is transmitted on another of the interfaces. If the multicast join message was not received on one of the ring interfaces, the multicast join message is transmitted on both of the ring interfaces. The method further includes receiving multicast data transmitted from a source node and destined for one or more receivers and transmitting the multicast data on the interface at which the multicast join message was received. Duplicate multicast data received from the source node is not transmitted to the receivers.

In another embodiment, a method generally comprises receiving a multicast join message at a node having a plurality of interfaces, transmitting the multicast join message to a first neighbor node, and transmitting an alternate multicast join message to an Interior Gateway Protocol (IGP) neighbor node. The method further includes receiving multicast data from the first neighbor node and the IGP neighbor node and dropping the multicast data received from the IGP neighbor node. The multicast data received from the first neighbor node is received at an interface identified as the primary incoming interface. The method further includes, upon identifying a failure wherein the multicast data is no longer received from the first neighbor node, changing the primary incoming interface to the interface in communication with the IGP neighbor node. The multicast data received at the primary incoming interface is transmitted from the node.

In yet another embodiment, an apparatus generally comprises a plurality of interfaces and a processor operable to process multicast join messages and multicast data received at the node, identify the interface at which the multicast join message was received, and select one or more of the interfaces to transmit the multicast join message based on whether the multicast join message was received on one of the ring interfaces. The apparatus further includes a transmitter configured, if the multicast join message was received on one of the ring interfaces, to transmit the multicast join message on another of the interfaces, and if the multicast join message was not received on one of the ring interfaces, to transmit the multicast join message on both of the ring interfaces. The transmitter is further configured to transmit the multicast data on the interface at which the multicast join message was received to a receiver.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein operate to reroute multicast data with minimal packet loss following a network failure. The method and system are referred to herein as multicast fast reroute (or multicast-only fast reroute). The multicast fast reroute system reroutes data before a failure is identified by a unicast routing protocol to provide minimal packet loss. The system operates to provide fast reroute to a backup path by making a local decision to switch to the backup, which requires less time than waiting for a unicast routing protocol signal on the network to switch to backup. As described in detail below, the system transmits alternate join messages and distributes redundant multicast data in a network. During normal operation, the redundant packets are discarded. When a failure occurs in a primary path, the redundant data is accepted after a local and very fast decision is made to accept the data. Multicast fast reroute may be performed as described in U.S. patent application Ser. No. 11/789,927, filed Apr. 26, 2007, which is incorporated herein by reference in its entirety. The multicast fast reroute described in U.S. patent application Ser. No. 11/789,927 may be performed on various topologies including triangle topologies (e.g., symmetric triangle (Equal Cost Multi-Path (ECMP) or asymmetric triangle) or ring topologies, for example. Details for implementing embodiments of multicast fast reroute for various topologies are described herein. Details include identification of IGP (Interior Gateway Protocol)-downstream nodes and creation of a control plane and data plane for use in multicast fast reroute. Also described herein are embodiments for leveraging commonalities in control plane states to enable a reduction in the number of modifications required to update the states upon failure detection. These embodiments may be used with all types of multicast fast reroute, including ECMP mode, IGP mode, and ring mode.

The embodiments described herein operate in the context of a data communication network including multiple network elements. Some of the elements in a network that employs the multicast fast reroute may be routers, switches, gateways, or other network devices. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate application software. In one embodiment, the network device is implemented on a general purpose network host machine as described below with respect to FIG. 11.

A network implementing the embodiments described herein is configured to use IP multicast, which simultaneously delivers a single stream of information to numerous recipients. A brief discussion of multicast routing is provided to help introduce concepts used in the embodiments described herein.

Multicast operation is based on the concept of a group. A multicast group is an arbitrary group of receivers that expresses an interest in receiving a particular data stream. An IP multicast address, or a portion thereof, specifies a particular group. Hosts that are interested in receiving data flowing to a particular group join the group using Internet Group Management Protocol (IGMP) or Multicast Listener Discovery (MLD), for example.

Multicast-capable routers create distribution trees that control the path that IP multicast traffic takes through the network in order to deliver traffic to all receivers. Members of multicast groups can join or leave at any time; therefore the distribution trees are dynamically updated. In one embodiment, Protocol Independent Multicast (PIM) is used to dynamically create a multicast distribution tree to ensure distribution to intended receivers while limiting distribution so that network segments that are not in the path between the source and receivers are not burdened with unnecessary traffic.

In unicast routing, traffic is forwarded through the network along a single path from a source to the destination host according to pre-computed routes. A unicast router does not typically consider the source address; it considers only the destination address and how it would forward the traffic toward that destination. By contrast, in multicast forwarding the source is sending traffic to an arbitrary group of hosts that are represented by a multicast group address. The multicast router must determine which direction is the upstream direction (towards the root of the tree), and which one is the downstream direction (or directions). If there are multiple downstream paths, the router replicates the packet and forwards it down the appropriate downstream paths based on receiver interest. Forwarding multicast traffic away from the root is called Reverse Path Forwarding (RPF).

"RPF failure" is an important concept in multicast routing operation. Unicast routing techniques are used to determine a path from a receiver or intermediate node back to the tree root. Packets received via this path from the tree root are eligible for further forwarding downstream. When RPF is enabled on an interface, the router examines all packets received as input on that interface to make sure that the source address and source interface appear in the routing table and match the interface on which the packet was received. Packets received on other interfaces not connected to this path will not be forwarded and their receipt is referred to as RPF failure. As described below, RPF failure is used to identify redundant packet data.

Referring now to the drawings, and first to FIG. 1A, an example of a network, generally indicated at 110, configured for multicast fast reroute is shown. The network 110 shown in FIG. 1A includes a ring 112 comprising nodes 114, 116, 118, 120, 122, 124, and 126. The nodes are connected through communication links 140. One or more of the nodes may be provider edge (PE) devices. Nodes 114 and 126 are coupled to a source node 128 through nodes 130, 132. Nodes 130 and 132 may be, for example, customer devices coupled to the source 128 through a backbone.

Two receivers 134, 136 are shown connected to the source 128 through ring 112. The source node 128 transmits data to receivers 134, 136 via two loop-free paths (131, 133). Receiver 134 receives data from the first data path 131 (primary data path at node 122). Receiver 136 receives data from the second data path 133 (primary data path at node 116). Each data path may thus be referred to as a primary path for some of the nodes, while being a backup path for other nodes. It is to be understood that the term "receiver" as used herein may refer to a local receiver (134 at node 122) on the ring or a downstream receiver (136) connected to the ring by one or more nodes (node 138). As described in detail below, upon receiving a join message from the receiver (134, 136), the ring nodes (122, 116) translate the join message into two joins and create forwarding states. Each node 122, 116 receives two copies of the data stream (from data paths 131 and 133). Duplicate data packets received at nodes 122 and 138 are not transmitted to the receivers 134, 136. In the example shown in FIG. 1A, duplicate multicast data is transmitted to node 138 and dropped at node 138, however the data may be instead dropped at node 116, in which case only a single data stream would be transmitted to node 138. During normal operation (i.e., no failure in primary path), data received from the primary path is received at an RPF interface (referred to herein as a primary incoming interface). Data received from a secondary path is received at a non-RPF interface (referred to herein as a secondary incoming interface). Nodes 122 and 138 thus drop packets received from their backup path during normal operation. If a failure occurs in the primary path, the secondary incoming interface then becomes the primary incoming interface (RPF interface) and data from the backup path is transmitted to the receiver 134, 136.

Figure 1B:
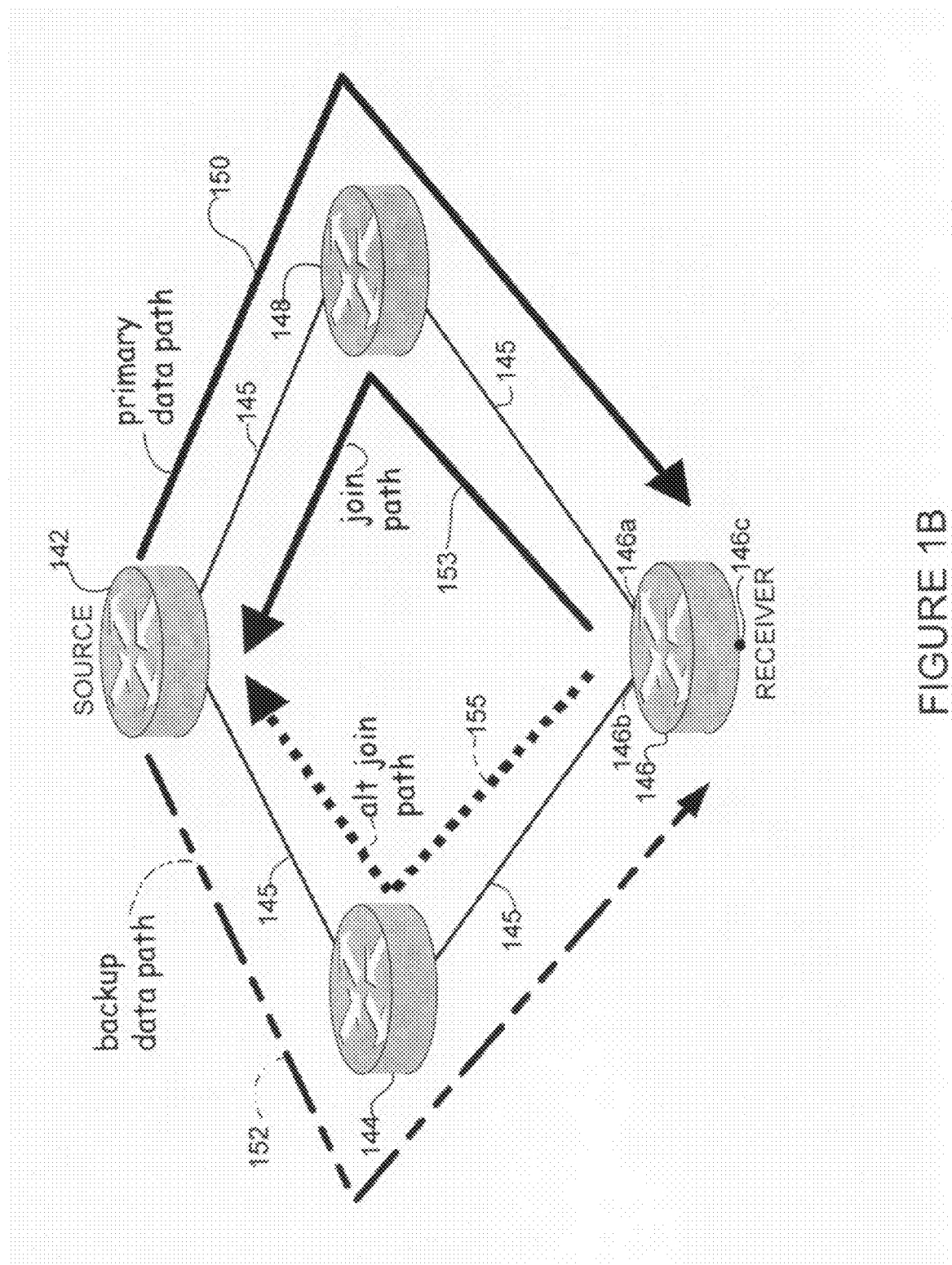
FIG. 1B illustrates an example of a network with a triangle topology, in which embodiments described herein may be implemented.

FIG. 1B illustrates another example of a network configured for multicast fast reroute. The network may be deployed according to asymmetric triangle topology (i.e., traffic is not distributed according to Equal Cost Multi-Path (ECMP) distribution). For simplification, only four nodes are shown; source node 142, receiver node 146, and intermediate nodes (e.g., distribution routers) 144, 148. The nodes are connected through communication links 145. It is to be understood that node 146 may represent a local receiver or a downstream receiver in communication with node 146 via one or more nodes at interface 146c, for example. Node 146 sends a join message (e.g., PIM join) on RPF path passing through node 148. The join message is transmitted at RPF interface (primary incoming interface) 146a onto join path 153 of FIG. 1B. Node 146 also sends out an alternate join message at non-RPF interface (secondary incoming interface) 146b on alt join path 155. It is to be understood that while the primary and backup join paths 153, 155 are shown traversing multiple hops, the join paths are typically calculated on a per-hop basis. The source node 142 has two outgoing interfaces and sends multicast data to node 146 via a primary data path 150 and a backup (alternate) data path 152. The primary data path 150 passes through node 148 and the backup data path 152 passes through node 144. The redundant multicast data transmitted on the backup path 152 will be discarded at node 146 until needed. If a failure occurs in the primary data path 150, the redundant data is made available and accepted at node 146.

It is to be understood that although the network shown in FIG. 1B is referred to herein as having a triangle topology to differentiate it from ring mode for specific implementations of multicast fast reroute (e.g., sharing described below), the term 'ring interface' as used herein includes interfaces such as interfaces 146a, 146b in a topology such as shown in FIG. 1B.

The network topologies described above preferably have source-to-edge router disjointness as follows The source node 128 is dual-homed to two distribution routers 130, 132 (FIG. 1A);

The receivers are connected to nodes (e.g., provider edge routers) which are either in rings or triangles:

In a ring topology, the node (e.g., node 122) is part of a ring which is connected via two distribution routers (nodes 114 and 126) (FIG. 1A);

In a triangle topology, the node (e.g., node 146) is dual-homed to two distribution routers (144, 148) (FIG. 1B); and The backbone connectivity of the distribution routers (114, 126) is such that the path from node 114 to node 130 is naturally disjoint to the path from node 126 to node 132 (FIG. 1A).

For any network with source-to-edge router disjointness, the multicast fast reroute described herein only needs to be implemented at the edge routers.

It is to be understood that the networks shown in FIGS. 1A and 1B are provided only as examples and that the multicast fast reroute described herein can be implemented in networks having different network elements or arrangements without departing from the scope of the invention.

Figure 2A:
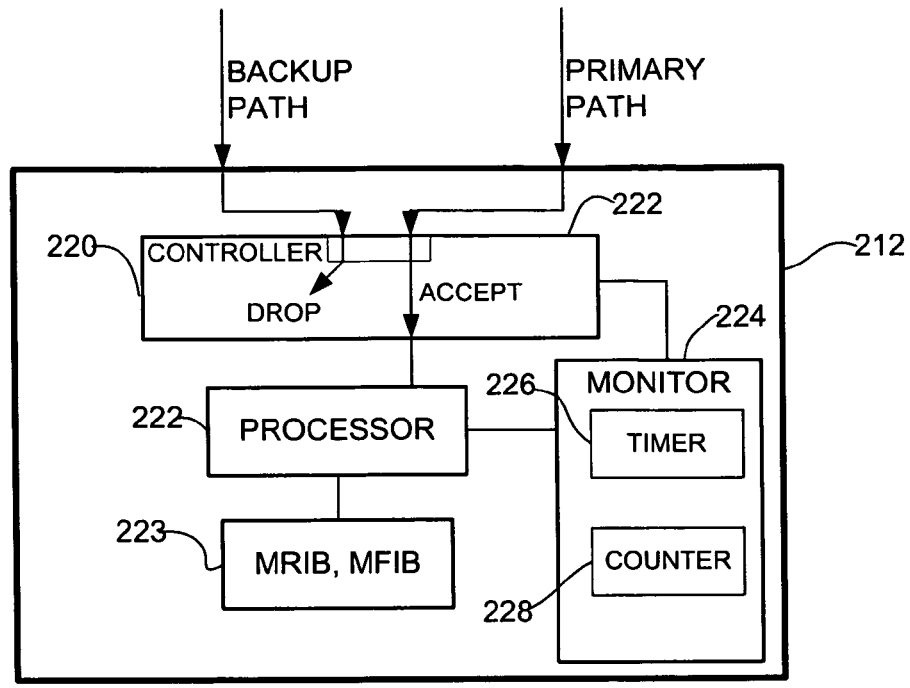
FIG. 2A is a block diagram illustrating one embodiment of a node of the network of FIG. 1A of FIG. 1B prior to failure in a primary path.
Figure 2B:
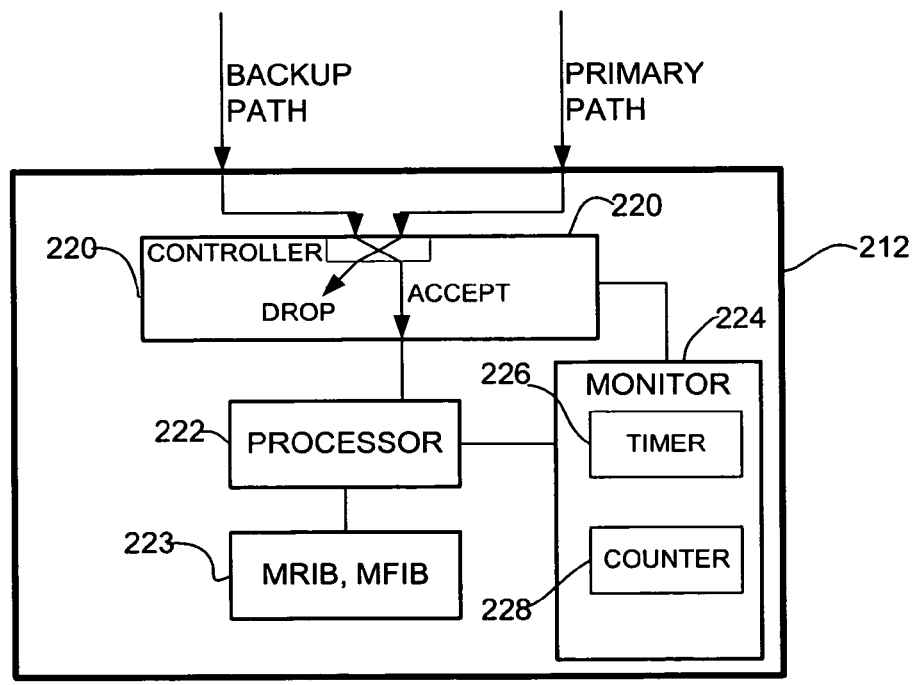
FIG. 2B is a block diagram illustrating the node after switching to a backup path.

FIGS. 2A and 2B are block diagrams schematically illustrating details of a node 212 according to one embodiment. The node 212 may be a receiver (e.g., node 146 in FIG. 1B), a ring node (e.g., node 122 in FIG. 1A) coupled to a receiver, or a node (e.g., node 138 in FIG. 1A) interposed between an edge node and the receiver. The node comprising a plurality of interfaces including at least two interfaces in communication with a source node. The node 212 is configured to receive two streams of data (primary and backup), identify a failure, and switch from the primary to the backup. As further described below, the node may switch to backup by changing the interface identified as a primary incoming interface from the interface connected to the primary path to the interface connected to the backup path. FIG. 2A shows the node 212 in a first mode (normal operation prior to a failure in the primary path) and FIG. 2B shows the node switched to a second mode (backup operation following a failure in the primary path). The node 212 includes a controller 220 operable to forward packets received from the primary path for processing at processor 222 and drop (i.e., not transmit) redundant packets received from the backup path, in the first mode (FIG. 2A). Upon receiving notification of a failure, the controller 220 is configured to switch to the second mode (FIG. 2B), so that packets received from the backup path are forwarded for processing and any packets received from the primary path are dropped.

In one embodiment, the node 212 comprises a monitor 224 for monitoring data packets received from the primary path. As described in detail below, the monitor 224 increments a counter 228 upon receiving a packet and starts a timer 226. Upon expiration of the timer 226, the monitor 224 checks to see if the counter 228 has changed (i.e., new packet received). If a packet has not been received, the monitor 224 signals the controller 220 that there is a possible failure on the primary path and the controller switches to the backup path (FIG. 2B).

The node 212 may also include an MRIB (Multicast Routing Information Base or RIB) and MFIB (Multicast Forwarding Information Base or FIB) 223. In one embodiment, the node 212 includes two incoming interfaces in hardware with a bit provided to determine which interface is used. Interface down notification may be sent to the MRIB or MFIB, which updates the bit. The controller 220 uses the entries in the MRIB or MFIB to determine which interface is currently connected to the primary path.

Figure 3:
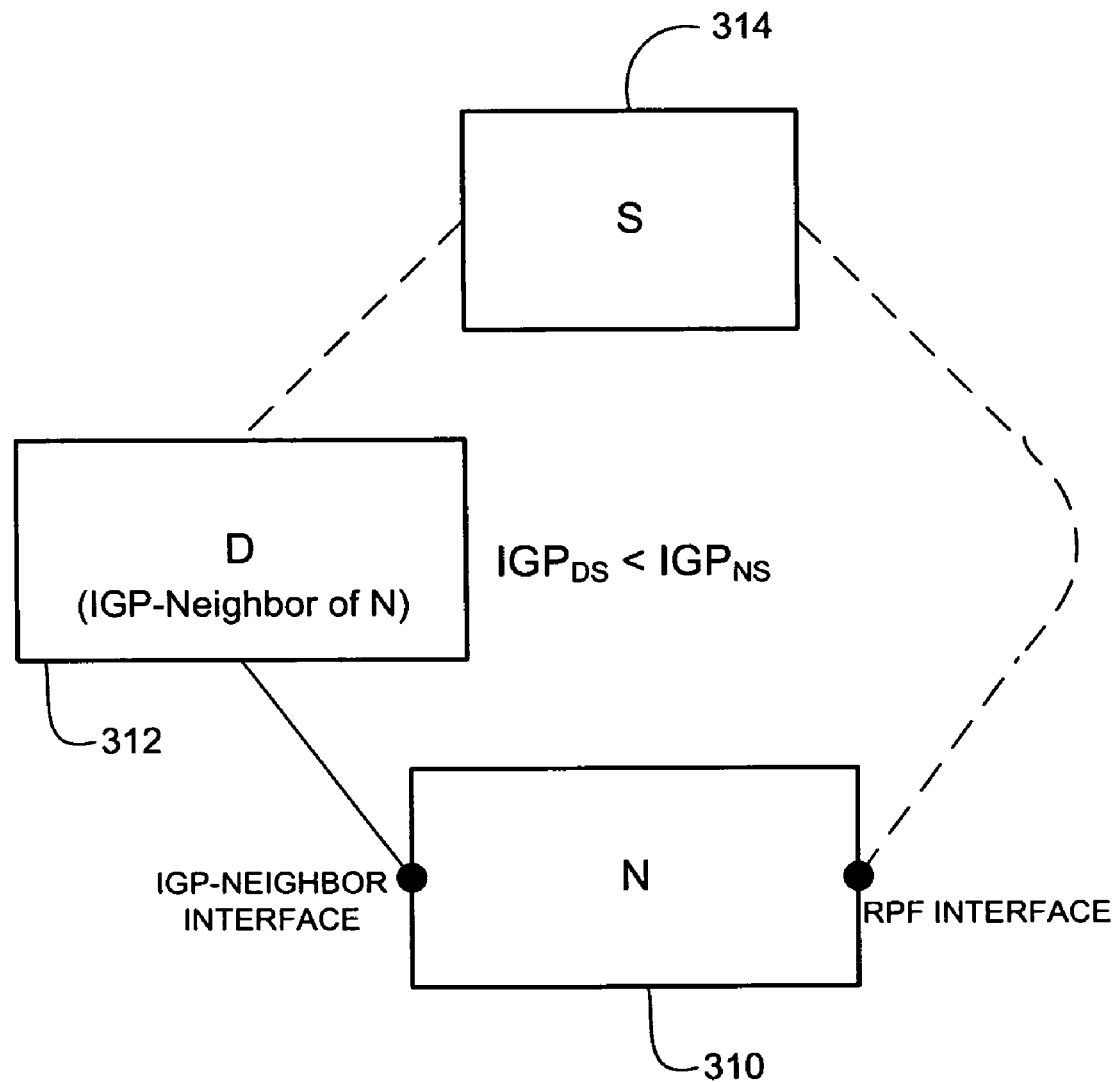
FIG. 3 illustrates downstream IGP topology.

In one embodiment, alternate joins are transmitted on IGP paths. FIG. 3 is a block diagram illustrating three nodes, node N 310, node D 312, and source node S 314. For simplification, only three nodes are shown, however, it is understood that there may be any number of nodes between node N 310 and source node 314, and node D 312 and source node 314. Node D is considered an IGP neighbor node with respect to node N for source node S if:

Node N and node D are direct neighbors; and

The IGP metric from node D to node S ($IGP_{DS}$) is smaller than the IGP metric from node N to node S ($IGP_{NS}$).

This ensures that node D cannot select node N as an alternate RPF neighbor for the source node S and prevents a control plane loop. This embodiment is referred to herein as "IGP mode".

Computation for selection of the IGP neighbor nodes may be performed in ISIS, OSPF, and EIGRP, for example. With ISIS/OSPF, a reverse-SPT rooted at the source node is computed and the path cost to source node from all of a node's direct neighbors is computed. Any of the direct neighbors with a path cost to the source node smaller than the nodes own path cost is an IGP neighbor candidate. In the case where there are several such candidates, the candidate with the shortest metric may be selected. Alternatively, the candidate which is the most disjoint from the normal RPF neighbor may be selected, wherein the best disjoint is when a branch of the alternate RPF merges the primary RPF branch at the source.

The following describes an example of a forwarding mechanism that can be used to organize data plane forwarding of multicast packets for multicast fast reroute. In the following description, the term 'Primary Forwarding' is used to refer to conventional multicast data plane FIB organization in which packets of the same (S, G) tree can only flow in one direction across a node. 'Primary/Secondary Forwarding' refers to an extension to Primary Forwarding to allow for packets of the same (S, G) tree to flow in two directions across a node.

Figure 4:
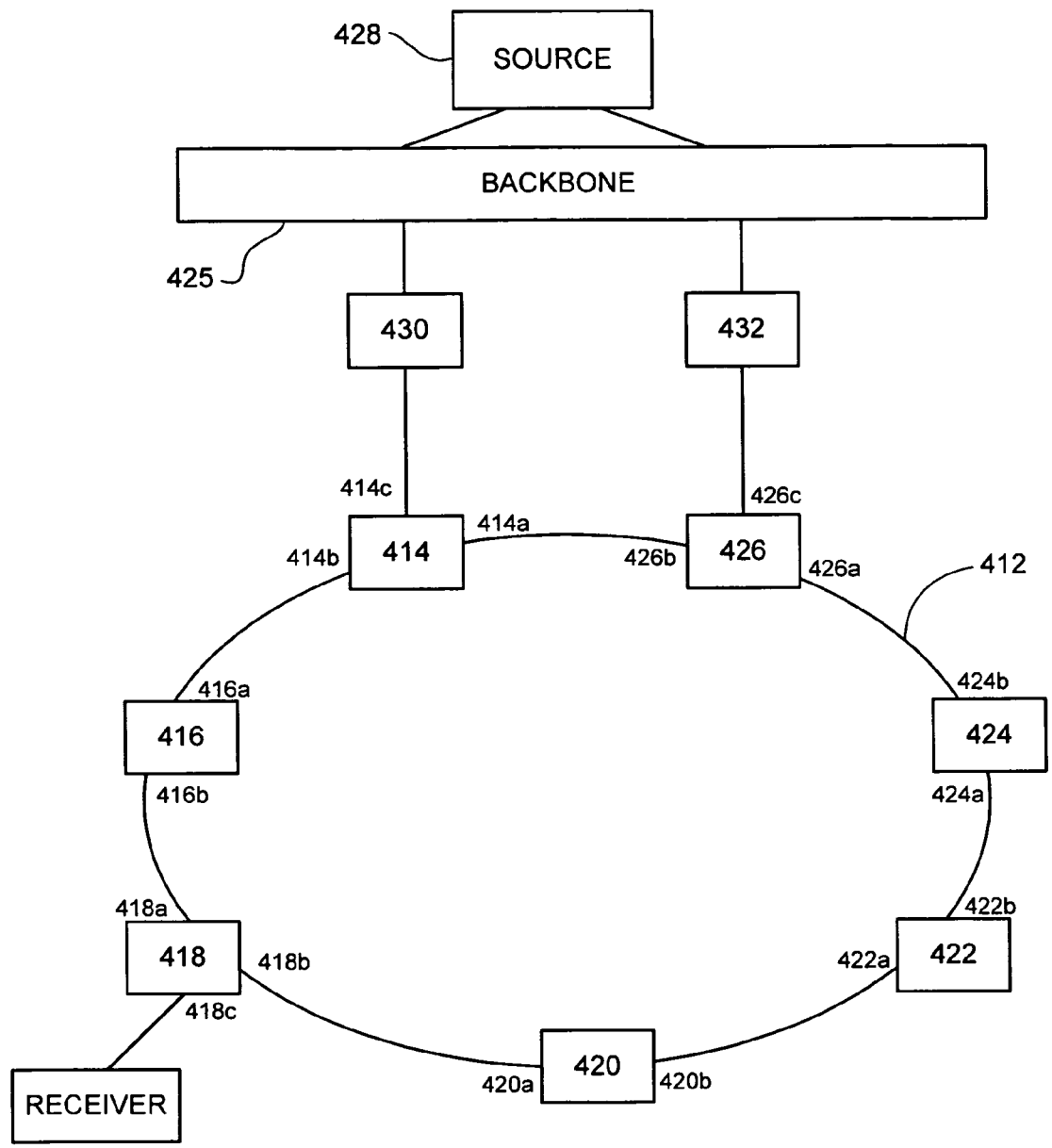
FIG. 4 illustrates the network of FIG. 1A with interfaces identified for the ring nodes.

FIG. 4 illustrates an example of a ring topology and shows interfaces for each ring node. In the network shown in FIG. 4, nodes 414, 416, 418, 420, 422, 424, and 426 are interconnected in a ring 412. A receiver is connected to the ring at node 418. The ring is connected to a backbone 425 and source node 428 via two nodes (e.g., routers) 430, 432. There may be any number of nodes in the ring. From a viewpoint of the ring nodes, two directions are defined along the ring: the RPF direction and the non-RPF direction. The RPF direction goes via the PIM RPF interface as commonly defined in PIM.

A data plane Primary Forwarding entry of (S, G) includes a set of interfaces 414a, 414b, 416a, 416b, 418a, 418b, 420a, 420b, 422a, 422b, 424a, 424b, 426a, 426b; a set of flags per interface (R, F)); and a set of fixed forwarding rules:

Packets received from R-flagged interfaces may only be replicated to F-flagged interfaces;

Packets may not be replicated back to their ingress interface.

Referring to FIG. 4, if node 418 needs to forward (S, G) packets received from interface 418a to interfaces 418b and 418c, the Primary Forwarding state sets the R flag on 418a and the F flags on interfaces 418b and 418c. This represents a conventional multicast forwarding state. The Primary Forwarding state cannot forward (S, G) packets received from interface 418a to interfaces 418b and 418c while also forwarding (S, G) packets received from interface 418b only to interface 418a. The Primary/Secondary Forwarding state described below is needed for this forwarding behavior.

A data plane for a Primary/Secondary Forwarding entry for (S, G) includes: a set of interfaces 414a, 414b, 416a, 416b, 418a, 418b, 420a, 420b, 422a, 422b, 424a, 424b, 426a, 426b; a set of flags per interface (R1, R2, F1, F2); and a set of fixed forwarding rules:

Packets received from R1-flagged interfaces may only be replicated to F1-flagged interfaces;

Packets received from R2-flagged interfaces may only be replicated to F2-flagged interfaces; and Packets may not be replicated back to their ingress interface.

In the example of FIG. 4, if node 418 needs to forward (S, G) packets received from interface 418a to interfaces 418b and 418c and forward (S, G) packets received from interface 418b only to interface 418a, then the Primary/Secondary Forwarding entry for (S, G) sets the R1 and F2 flags for interface 418a, sets the R2 and F1 flags for interface 418b, and sets the F1 flag for interface 418c.

The following describes creation of a control plane for the multicast fast reroute ring state. From control plane viewing, if a receiver joins a tree (S, G) at provider edge node 418, joins are transmitted in the clockwise direction to node 414 and in the counterclockwise direction to node 426. The state creation and join refreshing should avoid any persistent control plane loop. In order to create a control plane meeting these requirements, three rules apply:

Rule 1: If a ring node receives an IGMP join or a PIM join on a non-ring interface, the RPF interface (primary incoming interface) is one of the two ring interfaces, and the (S, G) matches the policy, then build/update a multicast fast reroute ring state and send/refresh PIM joins on both ring interfaces.

Rule 2: If a ring node receives a PIM join on a ring interface, the RPF interface (primary incoming interface) is one of the two ring interfaces, and the (S, G) matches the policy, then build/update a multicast fast reroute ring state and send/refresh PIM joins on the other ring interface.

Rule 3: If a ring node receives a PIM join on a ring interface, the RPF interface (primary incoming interface) is not one of the two ring interfaces, and the (S, G) matches the policy, then build/update a normal PIM state and send/refresh PIM joins on the RPF interface.

Referring again to FIG. 4, in accordance with Rule 1, an IGMP/PIM join message received on interface 418c at node 418 causes PIM joins to be sent/refreshed to nodes 416 and 420 (on interfaces 418a and 418b, respectively). In accordance with Rule 2, a PIM join received on interface 416b at node 416 causes PIM joins to be sent/refreshed to node 414 (from interface 416a). In accordance with Rule 3, a PIM join received at interface 414b on node 414 causes PIM joins to be sent/refreshed to node 430 at interface 414c.

Two embodiments for data plane implementation (Primary/Secondary Forwarding state and Primary Forwarding state) are described below. One of these two data plane states may be selected for implementation based on system requirements and network resources.

Figure 5:
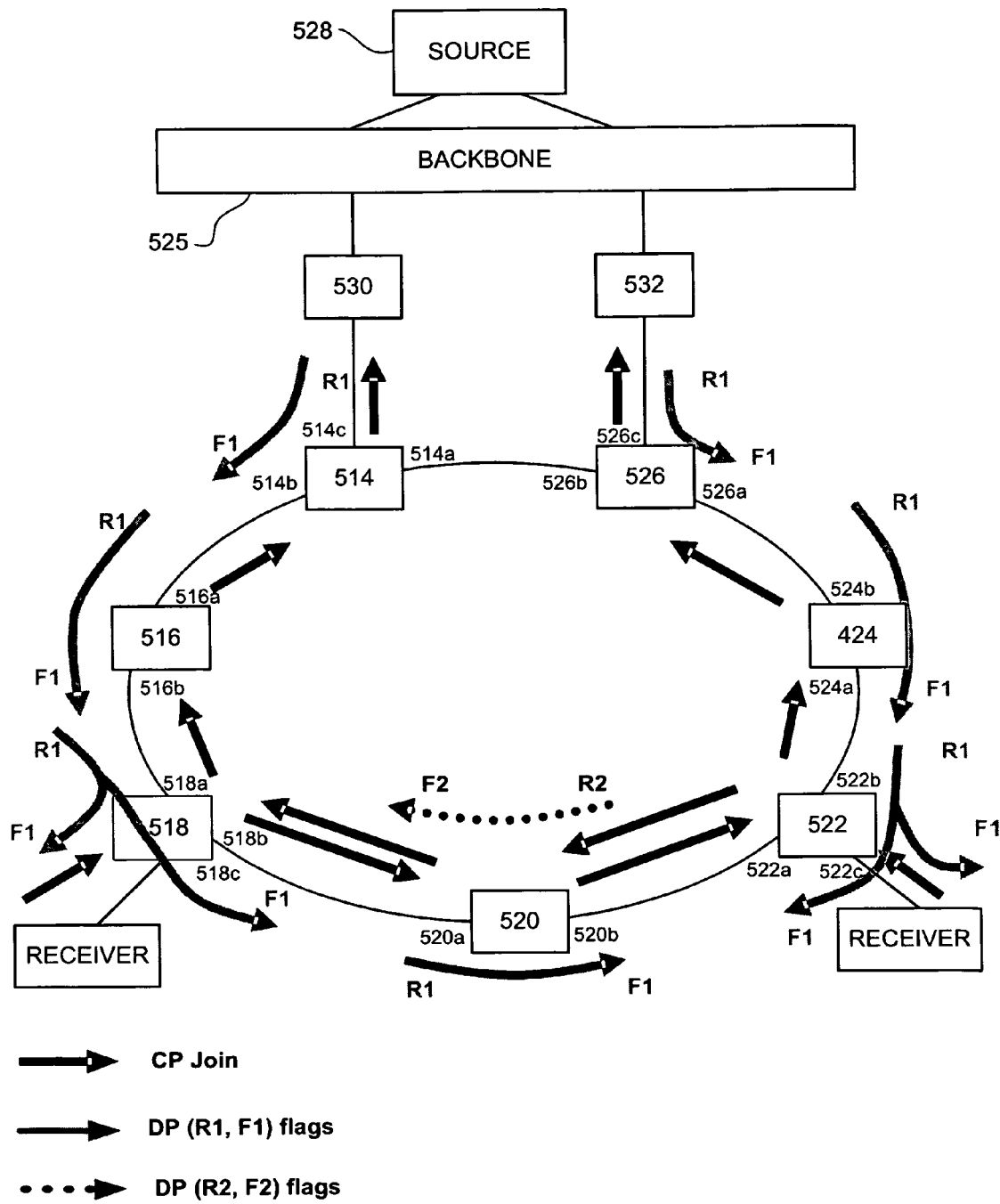
FIG. 5 illustrates control plane joins and data plane flags for the network of FIG. 4 with a Primary/Secondary Forwarding data plane state.
Figure 6:
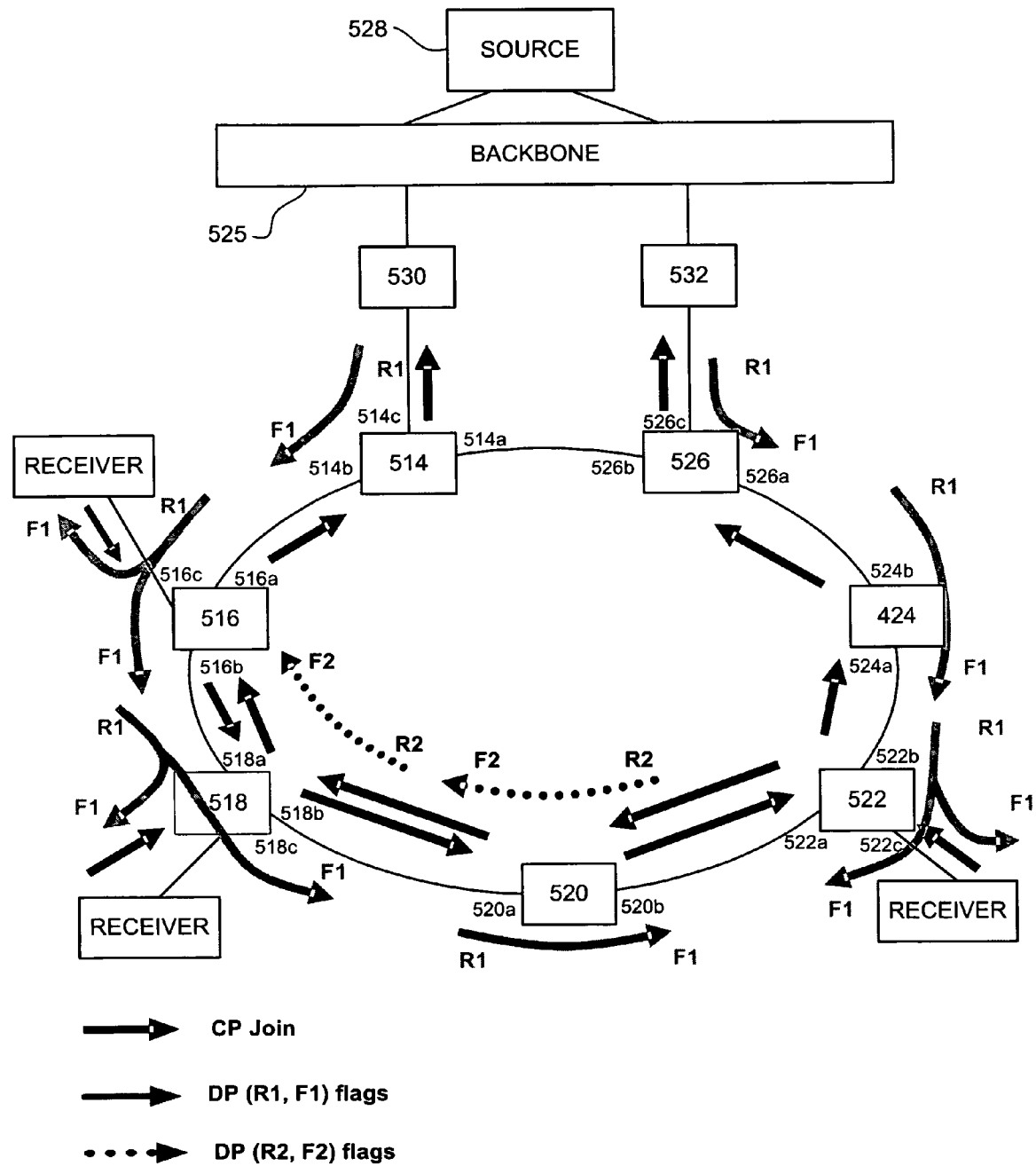
FIG. 6 illustrates the network of FIG. 5 with an additional receiver connected to the ring.
Figure 7:
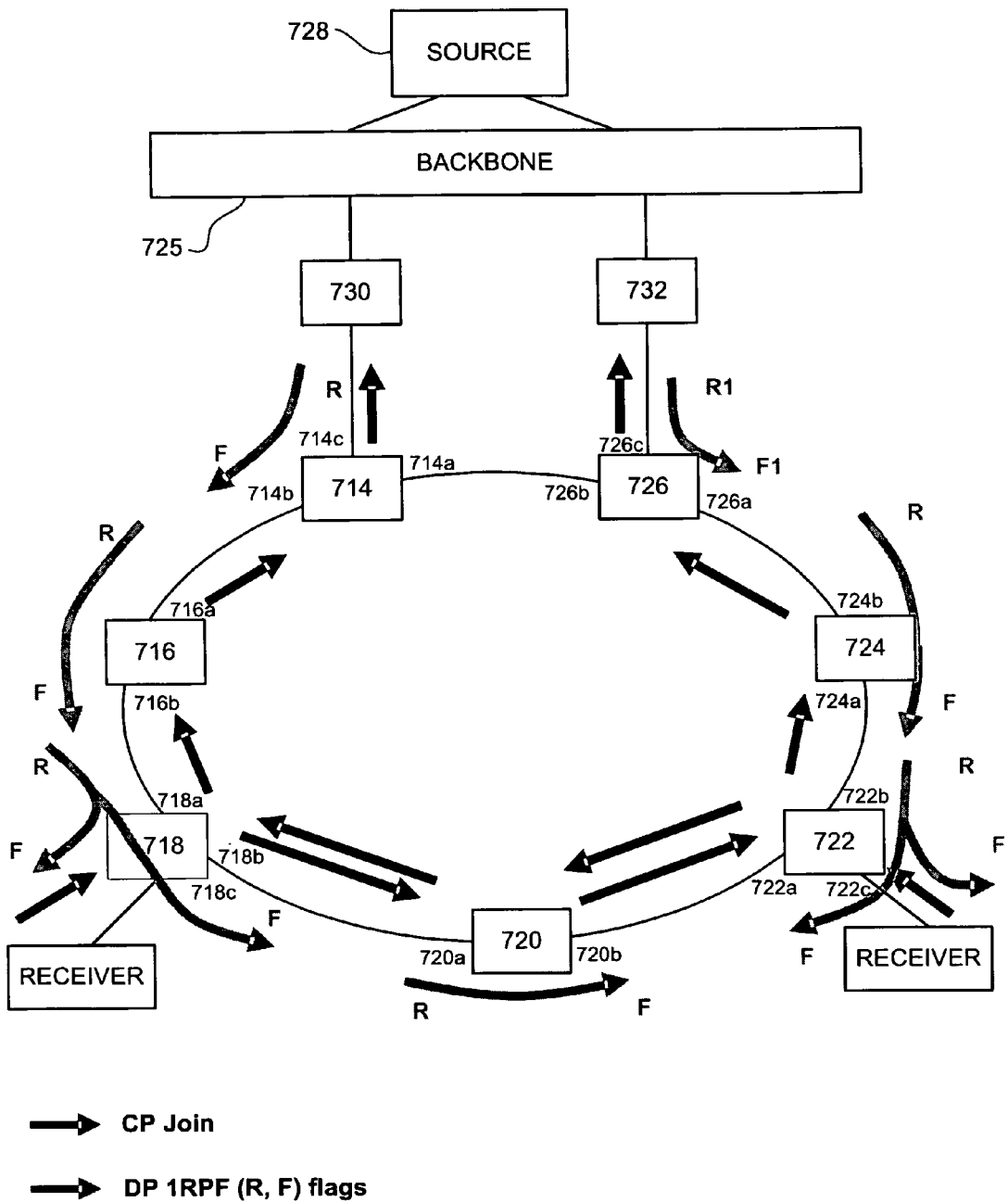
FIG. 7 illustrates control plane joins and data plane flags for the network of FIG. 4 with Primary Forwarding data plane state.
Figure 8:
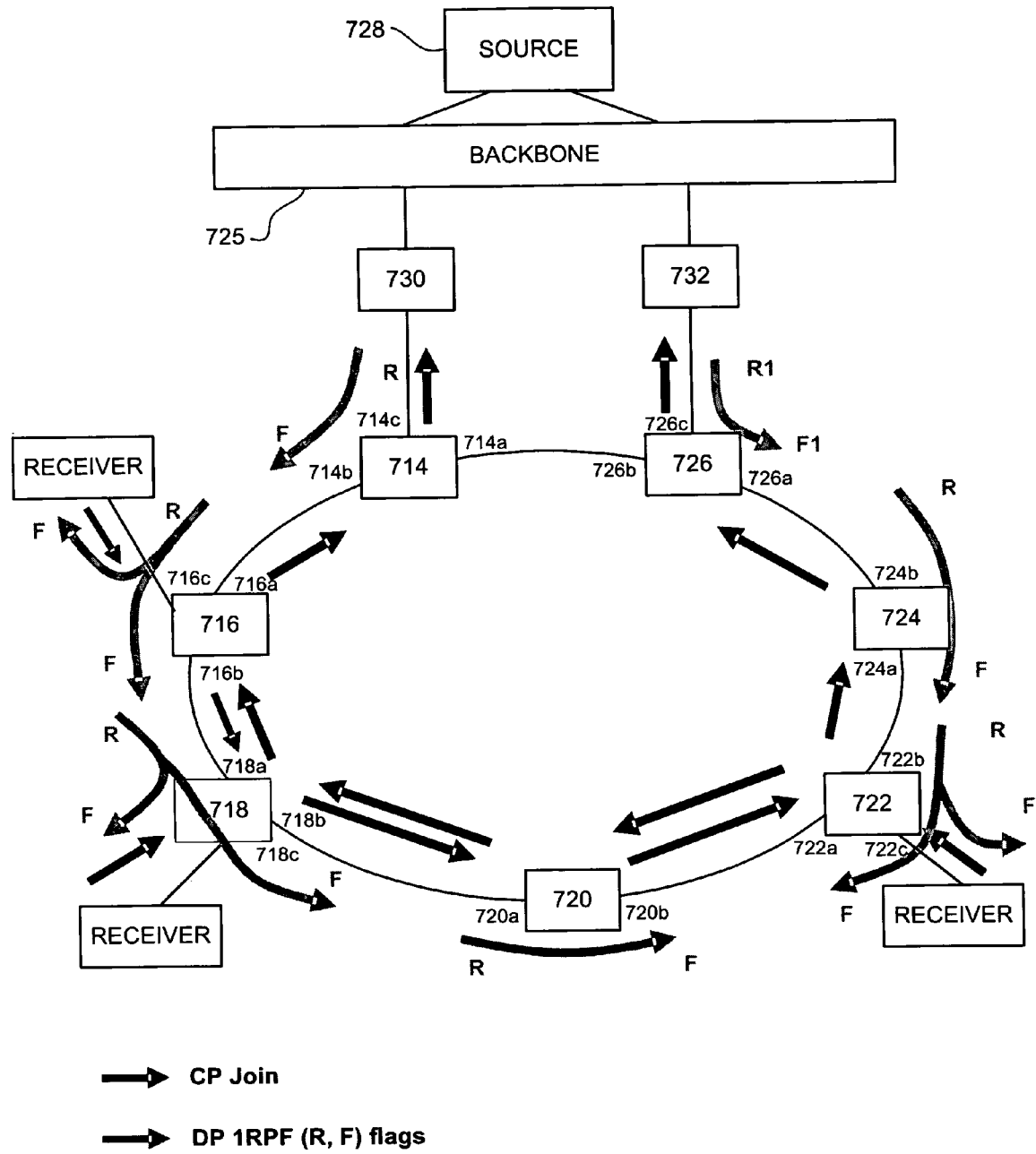
FIG. 8 illustrates the network of FIG. 7 with an additional receiver connected to the ring.

In the following description, FIGS. 5 and 6 illustrate data plane Primary/Secondary Forwarding state (alternate join topology) and FIGS. 7 and 8 illustrate data plane Primary Forwarding state. FIGS. 5-8 show generally the same network topology as FIG. 4, and corresponding nodes are identified with like reference numbers (e.g., 414, 514, and 714 refer to the same node on the ring). Also, each ring node comprises at least two ring interfaces identified by 'a' or 'b'

(e.g., 414*a*, 414*b*). Ring nodes (e.g., 414, 426) connected to the backbone or ring nodes (e.g., 418) connected to a receiver include a third interface identified by 'c' (e.g., 414*c*, 426*c*, 418*c*). The data plane Primary/Secondary Forwarding state will be described first, followed by the data plane Primary Forwarding state.

FIG. 5 illustrates receivers connected to nodes 518 and 522 and shows the control plane (CP) joins, data plane (DP) (R1, F1) flags and DP (R2, F2) flags. As illustrated in FIG. 5, at any point in time, the data plane forwarding entries along the ring are configured to ensure that packets destined to (S, G) received by node 514 flow down to nodes 518 and 522 via the counterclockwise direction and that packets destined to (S, G) received by node 526 flow down to nodes 518 and 522 via the clockwise direction. Receivers connected to any of the nodes in the ring via non-ring interfaces are fed by only one direction; the RPF direction. Upon failure of this RPF direction, the data plane implementation quickly feeds the receivers to the non-RPF direction. This requirement is met with the addition of the following rules to the above three control plane rules (the control plane rules are repeated from above and shown in italics, with the data plane rules added at the end):

Rule 1 (Primary/Secondary Forwarding state): *If a ring node receives an IGMP join or a PIM join on a non-ring interface, the RPF interface (primary incoming interface) is one of the two ring interfaces, and the (S, G) matches the policy, then build/update a multicast fast reroute ring state and send/refresh PIM joins on both ring interfaces.* Forward (S, G) packets from the RPF interface to the interface on which the IGMP/PIM join was received.

Rule 2 (Primary/Secondary Forwarding state): *If a ring node receives a PIM join on a ring interface, the RPF interface (primary incoming interface) is one of the two ring interfaces, and the (S, G) matches the policy, then build/update a multicast fast reroute ring state and send/refresh PIM joins on the other ring interface.* Forward (S, G) packets from the ring interface on which the join was sent towards the ring interface on which the join was received.

Rule 3 (Primary/Secondary Forwarding state): *If a ring node receives a PIM join on a ring interface, the RPF interface (primary incoming interface) is not one of the two ring interfaces, and the (S, G) matches the policy, then build/update a normal PIM state and send/refresh PIM joins on the RPF interface.* Forward (S, G) packets from the RPF interface towards the ring interface on which the join was received.

With reference to Rule 1 and FIG. 5, if node 518 receives an IGMP/PIM join at interface 518*c*, then node 518 builds the following Primary/Secondary Forwarding entries for (S, G): R1 flag is set for interface 518*a* and F1 flag is set for interface 518*c*. With reference to Rule 2 and FIG. 5, if node 516 receives a PIM join at interface 516*b*, then node 516 builds the following data plane Primary/Secondary Forwarding states: R1 flag is set at interface 516*a* and F1 flag is set at interface 516*b*. If node 520 receives a PIM join on interface 520*a*, then node 520 builds the following data plane Primary/Secondary Forwarding state: R2 flag is set at interface 520*b* and F2 flag is set at interface 520*a*. With reference to Rule 3 and FIG. 5, if node 514 receives a PIM join on interface 514*b*, then node 514 builds the following data plane Primary/Secondary Forwarding state: R1 flag is set at interface 514*c* and F1 flag is set at interface 514*b*.

FIG. 6 illustrates the example shown in FIG. 5 but with an additional receiver connected to node 516 (at interface 516*c*). In this case, the R2 flag is set at 518*b* and the F2 flag is set at 518*a*. FIG. 5 shows data flowing to the bottom of the ring, wherein FIG. 6 shows data flowing down and around the ring.

The following describes building of the data plane Primary Forwarding state from the control plane ring state with reference to FIG. 7. FIG. 7 illustrates control plane (CP) joins and data plane (DP) Primary Forwarding (R, F) flags. In the data plane Primary Forwarding state, ring nodes receive packets for (S, G) from only one direction, the conventional RPF direction. For example, in FIG. 7, if node 718 is the only node that received an IGMP join for (S, G), then data plane forwarding entries for (S, G) should only exist on nodes 716 connecting node 718 to its normal ring exit (node 714). The normal ring exit is the one of the two nodes (714, 726) connecting the ring to the backbone which is on the RPF path from node 718 to the source node 728 (i.e., 714 in this example). Upon failure of this RPF direction, node 718 receives packets for (S, G) from the non-RPF direction (after state is changed at nodes 718 and 720). This behavior is achieved with the addition of the following to the above three control plane rules (the control plane rules are repeated from above and shown in italics, with the data plane rules added at the end):

Rule 1 (Primary Forwarding state): *If a ring node receives an IGMP join or a PIM join on a non-ring interface, the RPF interface (primary incoming interface) is one of the two ring interfaces, and the (S, G) matches the policy, then build/update a multicast fast reroute ring state and send/refresh PIM joins on both ring interfaces.* Forward (S, G) packets from the RPF interface to the interface on which the IGMP/PIM join was received.

Rule 2 (Primary Forwarding state): *If a ring node receives a PIM join on a ring interface, the RPF interface (primary incoming interface) is one of the two ring interfaces, and the (S, G) matches the policy, then build/update a multicast fast reroute ring state and send/refresh PIM joins on the other ring interface.* Only forward (S, G) packets from the ring interface on which the join was sent towards the ring interface on which the join was received if the interface on which the join was sent is the RPF interface.

Rule 3 (Primary Forwarding state): *If a ring node receives a PIM join on a ring interface, the RPF interface (primary incoming interface) is not one of the two ring interfaces, and the (S, G) matches the policy, then build/update a normal PIM state and send/refresh PIM joins on the RPF interface.* Forward (S, G) packets from the RPF interface towards the ring interface on which the join was received.

With reference to Rule 1 and FIG. 7, if node 718 receives an IGMP/PIM join at interface 718*c*, then node 718 builds the following Primary Forwarding entry for (S, G): set R flag at interface 718*a* and F flag at interface 718*c*. With reference to Rule 2 and FIG. 7, if node 718 receives a PIM join at interface 718*b*, then node 718 builds the following data plane Primary Forwarding state: set R flag at interface 718*a* and F flag at interface 718*b*. If node 720 receives a PIM join at interface 720*a*, then node 720 does not update its Primary Forwarding state. With reference to Rule 3 and FIG. 7, if node 714 receives a PIM join on interface 714*b*, then node 714 builds the following data plane Primary Forwarding state: set R flag at interface 714*c* and F flag at interface 714*b*. FIG. 8 illustrates the example shown in FIG. 7 but with a receiver connected to node 716 (at interface 716*c*).

Figure 9A:
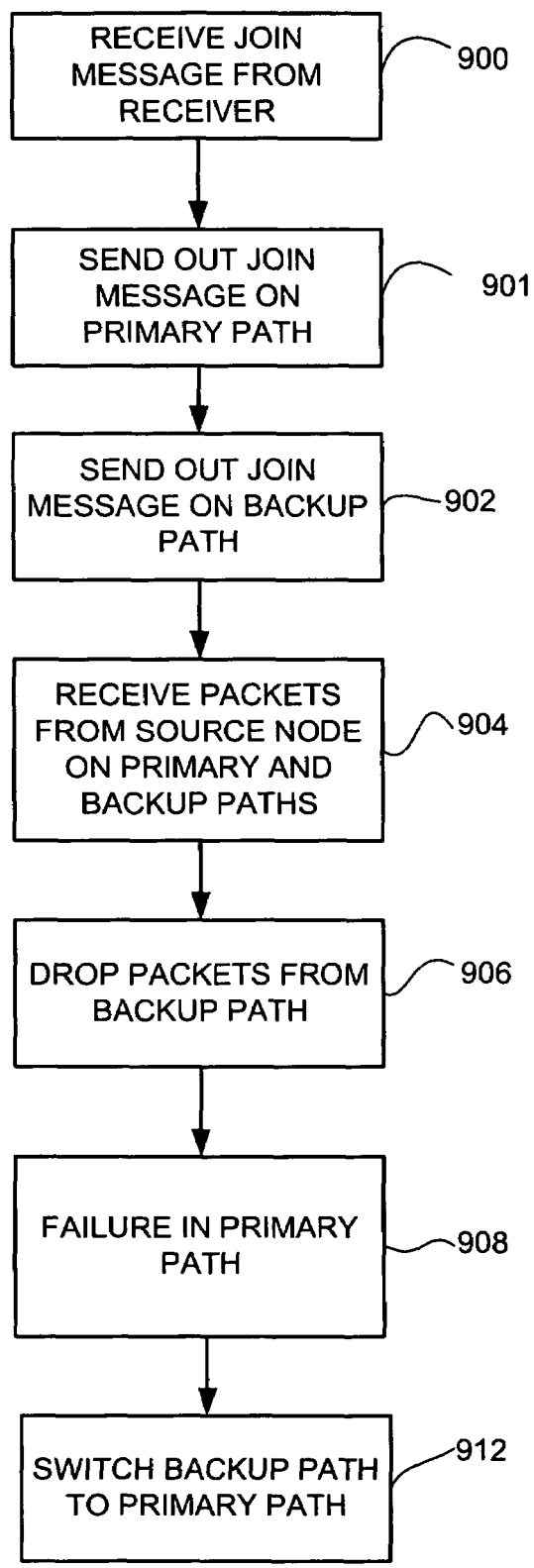
FIG. 9A is a flowchart illustrating a multicast fast reroute process, in accordance with one embodiment.

FIG. 9A is a flowchart illustrating one example of a process for multicast fast reroute. The flowchart of FIG. 9A illustrates an overview of the multicast fast reroute process at node receiving a join message from a receiver. Details of the multicast fast reroute process for all nodes on a ring are described below with respect to the flowcharts of FIGS. 9B, 9C, and 9D. Upon receiving a multicast join message (e.g., IGMP, PIM join) from a receiver at a node (step 900), the node sends a multicast join message (e.g., PIM join) on a primary path (e.g., to primary incoming interface (RPF) neighbor node 148 on join path 153 in FIG. 1B, clockwise CP join from node 518 in FIG. 5) (step 901). It is to be understood that receiving a join message also includes generating a join message in the case where there is a local receiver at the node on the ring or triangle. The node also sends out an alternate multicast join message on a backup path (e.g., IGP-downstream neighbor node 144 on alt join path 155 in FIG. 1B, counterclockwise CP join from node 518 in FIG. 5) (step 902). The primary path is preferably the RPF path and the backup path the non-RPF path. The node receives duplicate multicast data from the source node (data from the primary path and redundant data from the backup path) (step 904). The node drops (i.e., does not transmit) packets from the backup data path (step 906). The backup data may be dropped based on an RPF failure, which signifies that a packet arrived on an interface that is not the one where packets from this source and group are expected to arrive. At step 908 there is a failure in the primary path. The node then switches to the backup path by forwarding packets which were previously received at the secondary incoming interface (step 912). The node may switch the primary incoming interface from the interface at the primary path to the interface at the backup path (secondary incoming interface) so that the backup data path is identified as the new RPF path. Therefore, packets received at the backup path interface will no longer be dropped. The RIB or FIB may be updated and outgoing interface (OIF) list updated as described further below.

Figure 9B:
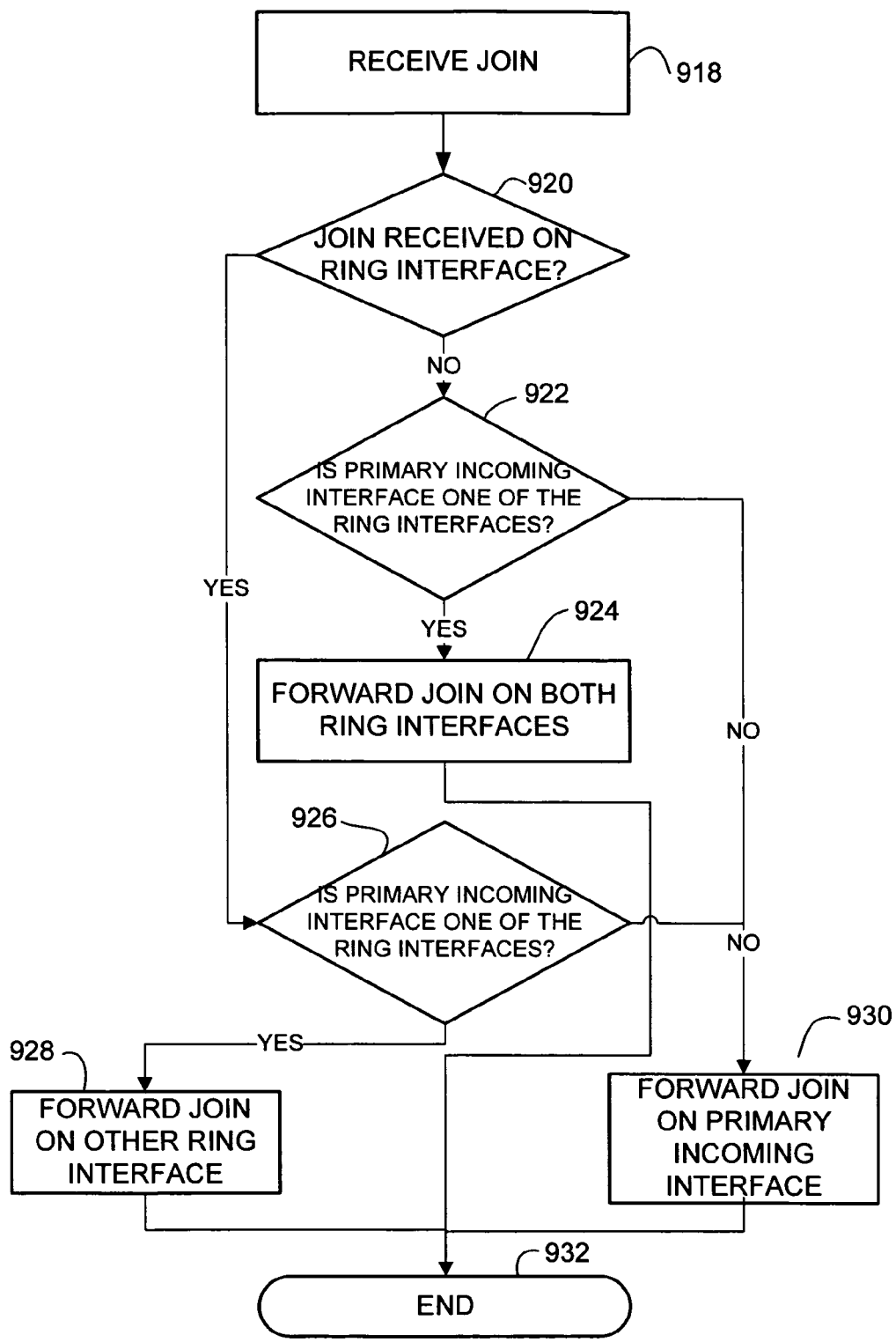
FIG. 9B is a flowchart illustrating a process for creating a control plane for multicast fast reroute, in accordance with one embodiment.

FIG. 9B is a flowchart illustrating details of creating a control plane for multicast fast reroute in accordance with one embodiment. At step 918 a node receives an IGMP/MLD or PIM multicast join message. If the join message is received on a non-ring interface (e.g., 418c of FIG. 4) and the primary incoming interface is one of the two ring interfaces, PIM join messages are forwarded (sent or refreshed) on both ring interfaces (418a and 418b) (steps 920, 922, and 924). If the primary incoming interface is not one of the ring interfaces, the join is forwarded on the primary incoming interface (steps 922 and 93). If the join message is received on a ring interface (416b) and the primary incoming interface is one of the ring interfaces, a PIM join message is forwarded on the other ring interface (416a) (steps 920, 926, and 928). If the primary incoming interface is not one of the two ring interfaces, a PIM join message is forwarded on the primary incoming interface (414c) (steps 926 and 930). The process ends at step 932. For step 920, the (S, G) is preferably also checked to confirm that it matches a multicast fast reroute policy. Also, in addition to sending/refreshing PIM joins at steps 924, 928, and 930, the multicast fast reroute state is preferably built or updated. Upon creating the control plane and sending the join messages to the source, the data plane is built to forward (S, G) packets received from the source. The data plane may be built using Primary/Secondary Forwarding state (FIG. 9C) or Primary Forwarding state (FIG. 9D).

Figure 9C:
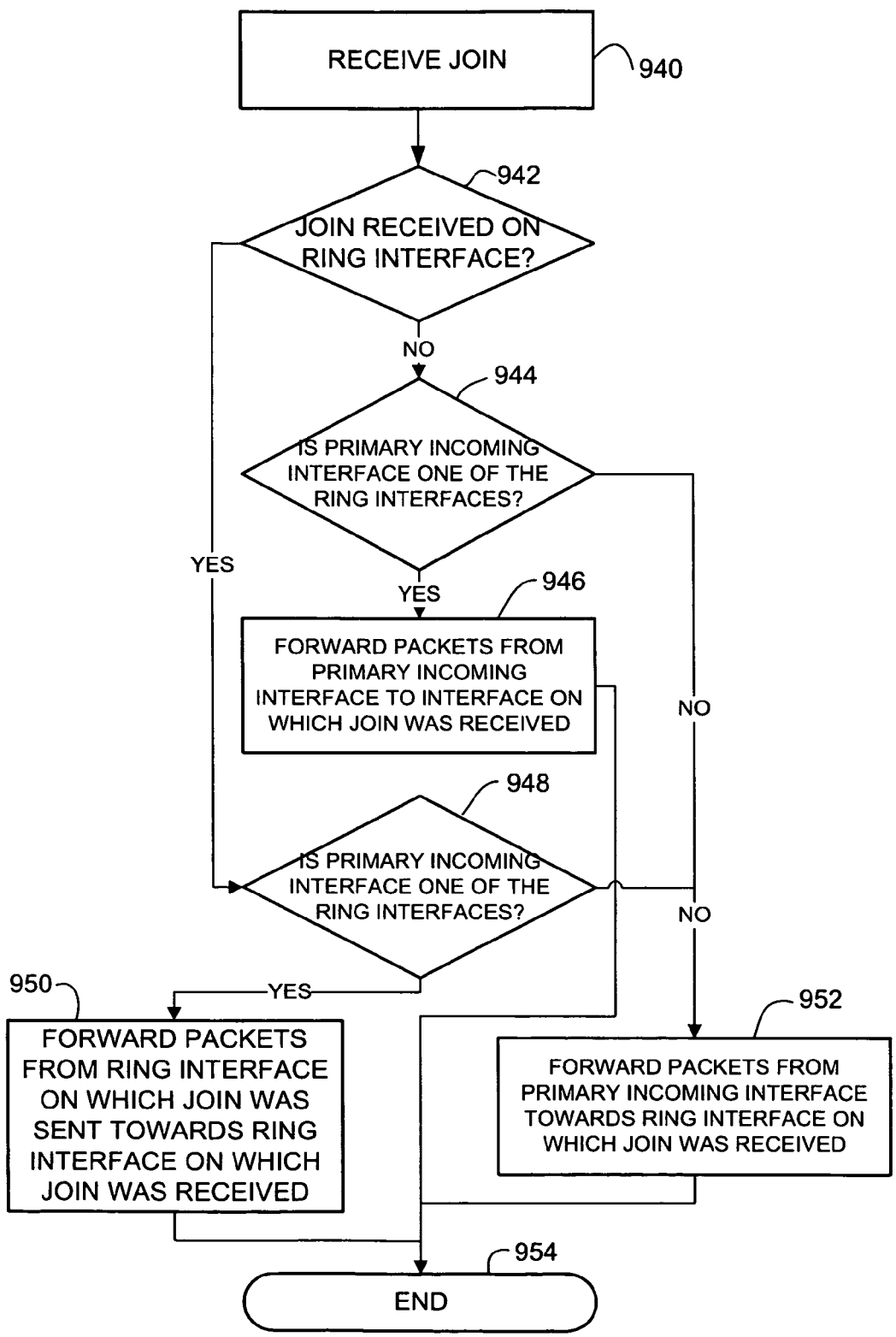
FIG. 9C is a flowchart illustrating a process for building a Primary/Secondary Forwarding state data plane for multicast fast reroute, in accordance with one embodiment.

FIG. 9C is a flowchart illustrating building of the data plane Primary/Secondary Forwarding state, in accordance with one embodiment. At step 940 a node receives an IGMP/MLD or PIM join message. If the join message is received on a non-ring interface and the primary incoming interface is one of the two ring interfaces, (S, G) packets are forwarded from the primary incoming interface to the interface on which the join message was received (steps 942, 944, and 946). If the primary incoming interface is not one of the ring interfaces, packets are forwarded from the primary incoming interface towards ring interface on which the join message was received (steps 944 and 952). If the join message is received on a ring interface and the primary incoming interface is one of the ring interfaces, (S, G) packets are forwarded from the ring interface on which the join message was sent towards the ring interface on which the join message was received (steps 942, 948, and 950). If the primary incoming interface is not one of the two ring interfaces, (S, G) packets are forwarded from the primary incoming interface towards the ring interface on which the join message was received (steps 948 and 952). The process ends at step 954.

Figure 9D:
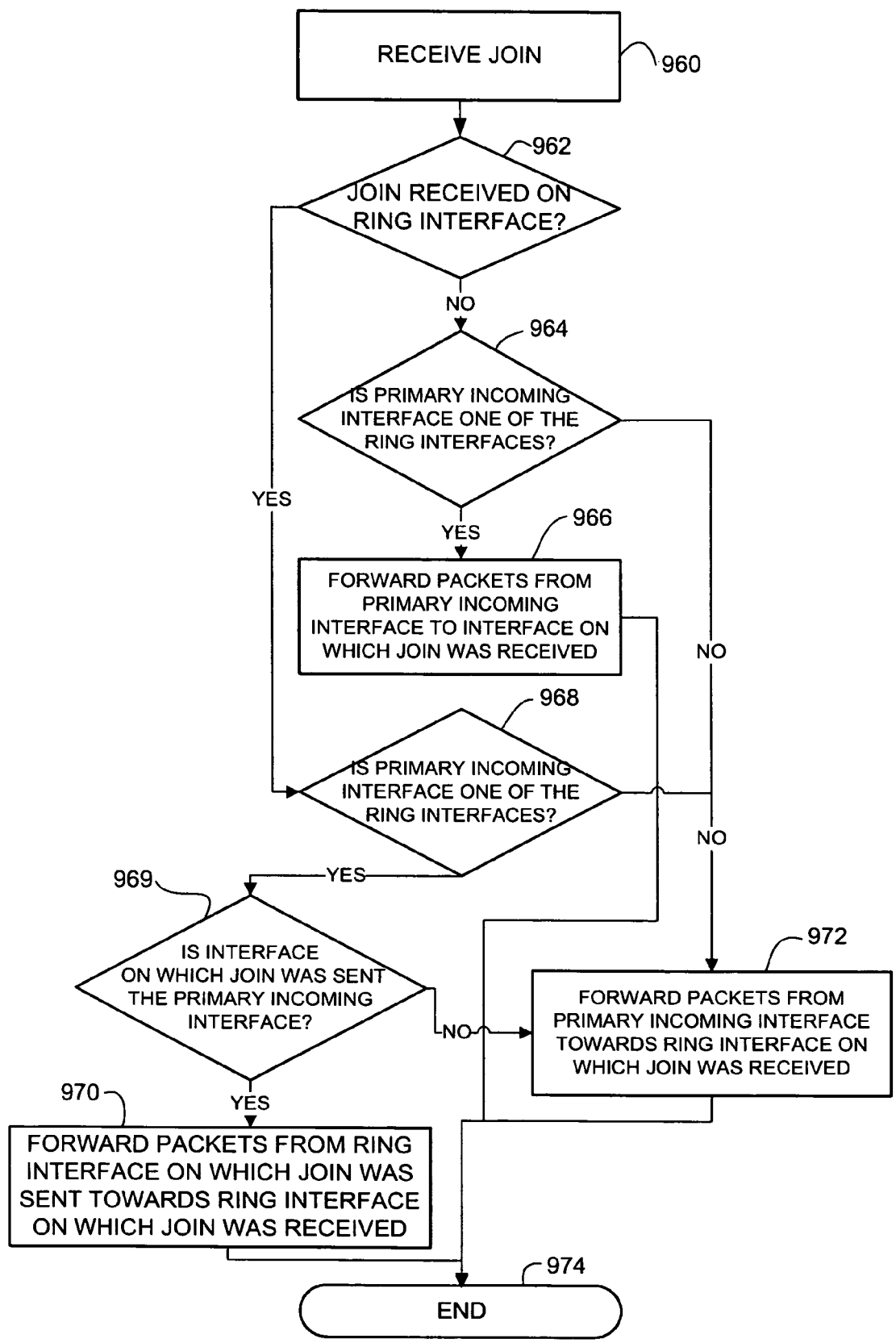
FIG. 9D is a flowchart illustrating a process for building a Primary Forwarding state data plane for multicast fast reroute, in accordance with one embodiment.

FIG. 9D is a flowchart illustrating building of the data plane Primary Forwarding state, in accordance with one embodiment. At step 960 a node receives an IGMP/MLD or PIM join message. If the join message is received on a non-ring interface and the primary incoming interface is one of the two ring interfaces, (S, G) packets are forwarded from the primary incoming interface to the interface on which join message was received (steps 962, 964, and 966). If the primary incoming interface is not one of the ring interfaces, packets are forwarded from the primary incoming interface towards the ring interface on which the join was received (steps 964 and 972). If the join message is received on a ring interface and the primary incoming interface is one of the ring interfaces, (S, G) packets are forwarded from the ring interface on which the join message was sent towards the ring interface on which the join message was received only if the interface on which the join message was sent is the primary incoming interface (steps 962, 968, 969, and 970). If the primary incoming interface is not one of the two ring interfaces, (S, G) packets are forwarded from the primary incoming interface towards the ring interface on which the join message was received (steps 968 and 972). The process ends at step 974.

In one embodiment, a failure is detected based on the idleness of a counter during a defined interval. As discussed briefly above with regard to FIGS. 2A and 2B, the node 212 includes a monitor 224 for monitoring data flow received from the primary data path. Counter 228 is incremented to signify the arrival of a new packet. If a new packet arrives, the counter 228 is incremented and the monitoring continues. If the timer 226 expires and the counter has not changed (i.e., a new packet has not arrived), a possible failure is identified on the primary data path from source to node 212. The node 212 then switches to backup mode. If the failure is eventually confirmed by the unicast routing protocol, the backup path is changed to the new primary path. If the failure is not confirmed after a predetermined period of time (e.g., 5-10 seconds), the node 212 may switch back to the primary path or remain on the backup path and switch the primary, and backup paths (i.e., switch the primary path to the backup path and the backup path to the primary path). It is to be understood that the "predetermined period of time" may be a set value or a calculated value that may vary.

In one embodiment, the timer 226 is set for approximately 100 milliseconds to account for inter-packet delay. In another embodiment, such as for use in a video context, the flow is typically never idle and the inter-packet gap is a few milliseconds. The idle period may therefore be defined as low as 50 milliseconds.

In another embodiment, the packet sequence numbers for packets received on the primary and secondary data paths are compared. The node forwards the first packet received regardless of whether the packet was received on the primary or secondary data path.

The following describes an embodiment in which sharing is used to leverage commonalities between control plane (S, G) states to enable upon failure detection, a reduced number of modifications (e.g., one or more) to protect all states with the same properties. With conventional systems, a failure would lead to replicating N times (e.g., N>1000), the same forwarding changes. The sharing may be performed at the PIM join level, RIB level or FIB level for the RPF interface or for both the RPF interface and OIF list as an aggregate or as individual entries. In one embodiment, the sharing is performed at the conventional Primary Forwarding data plane FIB organization and supports all multicast fast reroute modes (ECMP, IGP, ring).

Upon failure detection, the Primary Forwarding entry is changed. For ECMP and IGP multicast fast reroute modes, the primary incoming (RPF) interface is changed and the OIF (outgoing interface) list is not changed. For ring multicast fast reroute mode, the primary incoming interface and the OIF list are changed. For example, upon a failure at node 514 in FIG. 5, the OIF list at node 518 is changed as follows: before failure the OIF list includes both 518c and 518b, after the failure the OIF list includes only 518c.

In an IPTV context, a service provider (SP) may want the provider edge nodes to always request all channels from a set of sources. It is also likely that the sources reside on the same L2 (layer 2) subnet, hence from a routing viewpoint, the sources are all reachable via the same IGP route. If the channels which are always requested are allocated within a block, PIM SSM (Source-Specific Multicast) may be configured to request a (S, G/g) join instead of an (S, G) for each group in the block. Furthermore, if the sources for which all channels are always requested are allocated within a block and belong to the same IGP route, PIM SSM may be configured to request an (S/s, G/g) join instead of an (S, G) for each instantiation of the pair. If the OIF interfaces of all these states are the same, the RIB may add one single entry to the FIB, thereby improving the convergence time. If the OIF interfaces are not the same (which is the case when the provider edge node is connected to subscribers), then one of the following embodiments may be used.

The following applies to ECMP and IGP multicast fast reroute modes. In both cases, upon RPF-direction failure, the primary incoming interface is changed and the OIF list is not changed. In this forwarding model, each (S, G) FIB leaf has a pointer to a memory location which holds the primary incoming interface. The OIF list may either be indexed or not (in the following description, an index is used). Referring to the example shown in FIG. 1B (and assuming there is more than one source and group), if node 146 receives an IGMP join (S1, G1) at interface 146c (i0) and sends the primary PIM join on interface 146a (i1) and the alternate PIM join on interface 146b (i2), then the FIB control plane performs the following:

1. Add a leaf entry for (S1, G1);
2. Check whether the FRR enabled RPF location [i1, i2, flag] already exists. If not create the location. In any case, point the (S1, G1) RPF index to this memory location;
3. Check whether the OIF-list location (i0) already exists. If not create it. In any case, point the (S1, G1) OIF index to this memory location.

If node 146 later receives an IGMP join (S1, G2) from another interface (i4) and sends the primary PIM join on interface 146a (i1) and the alternate PIM join on interface 146b (i2), then the FIB control plane does the following:

4. Add a leaf entry for (S1, G2);
5. Check whether the FRR enabled RPF location (i1, i2) already exists. If it exists, just reuse it and point the (S1, G2) RPF index to this memory location;
6. Check whether the OIF-list location (i4) already exists. If not create the location. In any case, point the (S1, G2) OIF index to this memory location.

Upon failure detection related to S1, node 146 just needs to switch the flag bit within the FRR (fast reroute) enabled entry [i1, i2, flag] to get all the children (S, G) FIB leaves depending on this parent to use the secondary incoming interface.

From a packet forwarding viewpoint, the node looks up the FIB leaf, then it looks up the FRR-enabled RPF entry, then it looks up the flag. If the flag is reset it uses the primary incoming interface, otherwise the secondary incoming interface. FIB uses the same OIF list whatever the primary incoming interface is and hence the fetching of the OIF list can be done in parallel with the RPF processing. Two states (S1, G1) and (S2, G2) share the same parent (primary incoming interface, secondary incoming interface) if and only if they have the same primary incoming interface and the same secondary incoming interface. The two states may have different OIF lists. On a per-state basis, the OIF list is the same whether the primary incoming interface or the secondary incoming interface is used.

The following describes multicast fast reroute for ring mode. Upon RPF failure detection, both the primary incoming interface and the OIF list are changed. In this forwarding model, each (S, G) FIB leaf has a pointer to a memory location which holds the primary incoming interface and a pointer to a memory location which holds the OIF interface. Referring to the example of FIG. 5, node 518 includes interfaces 518a (i1), 518b (i2), 518c (i0), and a fourth interface (i4) (not shown). If for (S1, G1) the primary forwarding state is (RPF: i1; OIF: i0, i2) and the backup forwarding state is (RPF: i2; OIF: i0, i1), then the FIB control plane does the following:

1. Add a leaf entry for (S1, G1).
2. Check whether the FRR enabled RPF location [i1, i2, flag] already exists. If not create it. In any case, point the (S1, G1) RPF index to this memory location.
3. Check whether the FRR enabled OIF-list location [(i0, i2), (i0, i1)] already exists. If not create it. In any case, point the (S1, G1) OIF index to this memory location.

If node 518 later needs to add (S1, G2) whose primary forwarding state is (RPF: i1; OIF: i4, i2) and the backup forwarding state is (RPF: i2; OIF: i4, i1), then the FIB control plane does the following:

4. Add a leaf entry for (S1, G2).
5. Check whether the FRR enabled RPF location [i1, i2, flag] already exists. IF it exists, it points the (S1, G2) RPF index to this memory location.
6. Check whether the FRR enabled OIF-list location [(i4, i2), (i4, i1)] already exists. If not create it. In any case, point the (S1, G2) OIF index to this memory location.

Upon failure detection related to source S1, node 518 just needs to switch the flag bit within the FRR enabled RPF entry [i1, i2, flag] to get all the children (S, G) FIB leaves to use the secondary incoming interface and the backup OIF list.

From a packet forwarding viewpoint, the node looks up the FIB leaf, then it looks up the FRR-enabled RPF entry, then it looks up the flag. If the flag is reset it uses the primary incoming interface, otherwise the secondary incoming interface. FIB then looks up the FRR-enabled OIF entry. If the previously fetched flag bit is reset, the primary OIF list is used. If it is set, the secondary OIF list is used. The OIF fetch operation may be done in parallel with the RPF fetch operation, however, the OIF selection may only be done once the flag in the RPF fetched entry is known.

Figure 10:
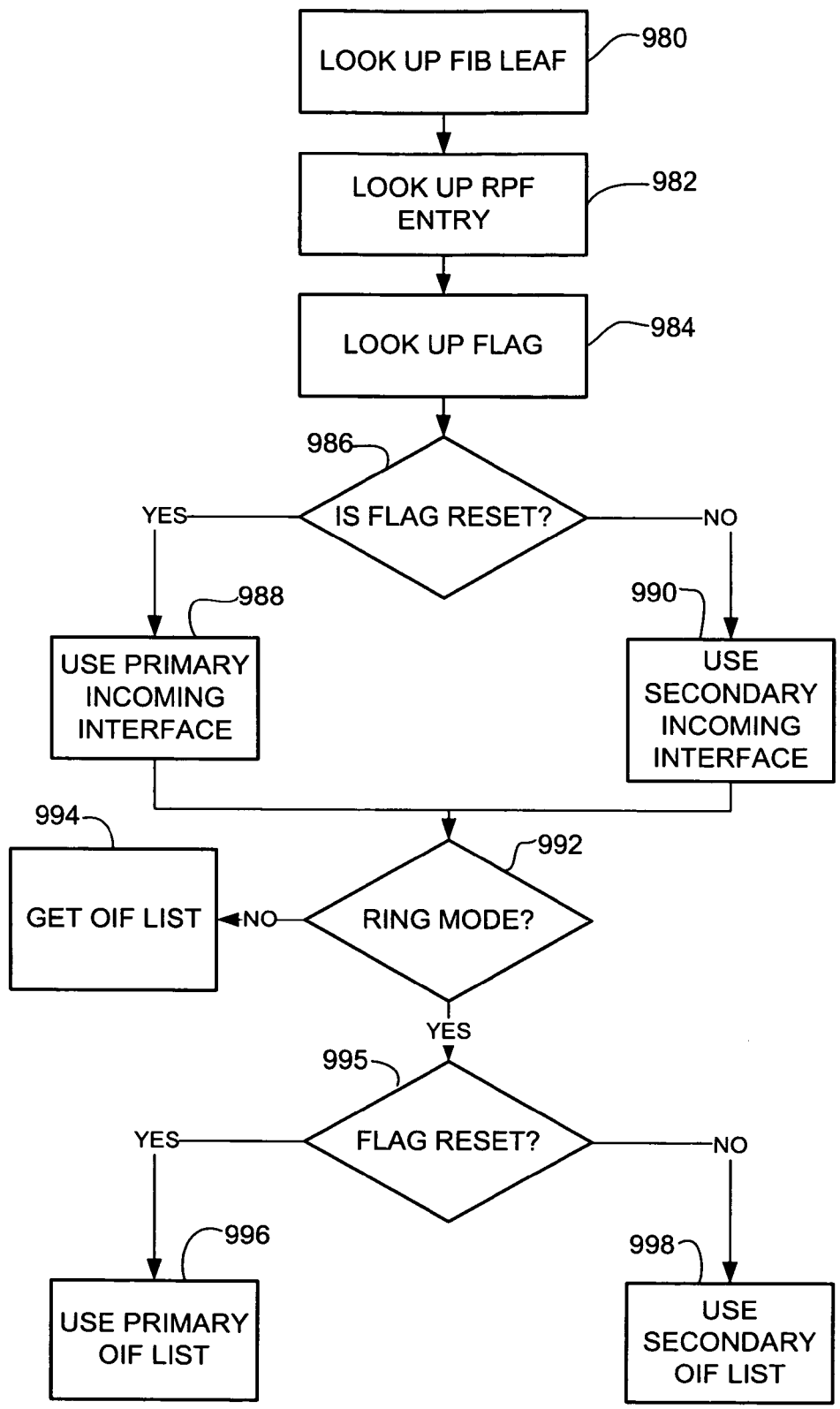
FIG. 10 is a flowchart illustrating a process for sharing forwarding entries so that upon failure, a single forwarding change can be used to update control plane states.

FIG. 10 is a flowchart illustrating an example of the process described above for sharing forwarding entries so that upon failure, a single forwarding change can be used to update control plane states. At step 980 the node looks up the FIB leaf. The node then looks up the FRR-enabled RPF entry (step 982) and looks up the flag (step 984). If the flag is reset (step 986), the primary incoming interface is used (step 988), otherwise the secondary incoming interface is used (step 990). If a multicast fast reroute mode other than ring mode is used (step 992) the FIB uses the same OIF list regardless of what the incoming (RPF) interface is (step 994). If multicast fast reroute ring mode is used and the previously fetched flag bit is reset, the primary OIF list is used (steps 992, 995, and 996). If the flag is set, the secondary OIF list is used (steps 995 and 998). As previously noted, fetching of the OIF list may be performed in parallel with RPF processing for ECMP or IGP modes. For ring mode, the OIF fetch operation may be done in parallel with the RPF fetch operation, however, the OIF selection cannot be made until the flag in the RPF fetched entry is known.

Figure 11:
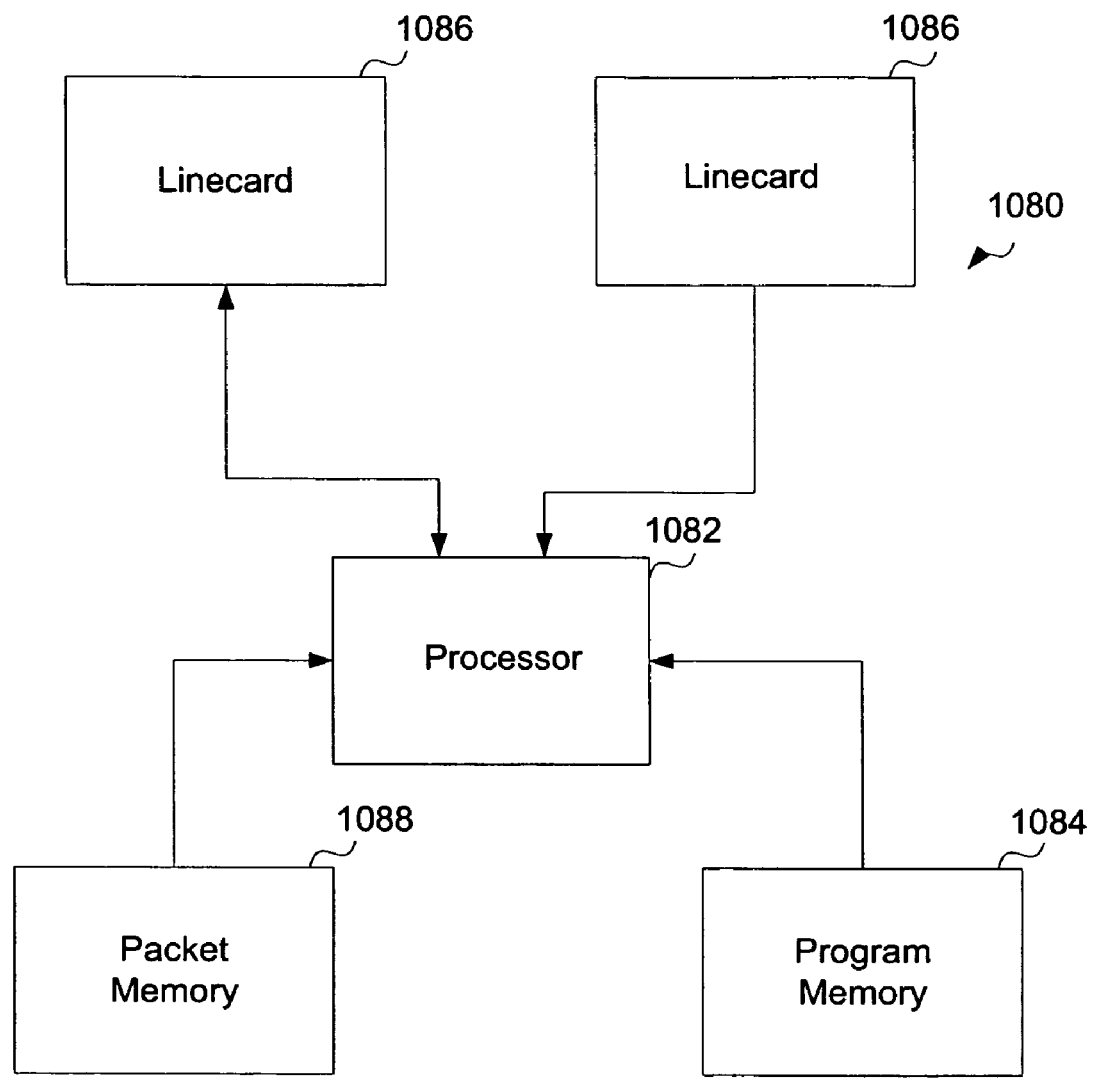
FIG. 11 depicts an example of a network device useful in implementing embodiments described herein.

FIG. 11 depicts a network device 1080 that may be used to implement embodiments described herein. In one embodiment, network device 1080 is a programmable machine that may be implemented in hardware, software, or any combination thereof. Logic may be encoded in one or more tangible media for execution by processor 1082. For example, processor 1082 may execute codes stored in a program memory 1084. Program memory 1084 can be utilized to store and retrieve software programs incorporating computer code that implements aspects of the invention, data for use with the invention, and the like. Program memory 1084 is one example of a computer-readable medium. Program memory 1084 can be a volatile memory. Another form of computer-readable medium storing the same codes would be some type of non-volatile storage such as floppy disks, CD-ROMs, DVD-ROMs, hard disks, flash memory, etc.

Network device 1080 interfaces with physical media via a plurality of linecards 1086. Linecards 1086 may incorporate Ethernet interfaces, DSL interfaces, Gigabit Ethernet interfaces, 10-Gigabit Ethernet interfaces, SONET interfaces, etc. As packets are received, processed, and forwarded by network device 1080, they may be stored in a packet memory 1088. To implement functionality according to the system, linecards 1086 may incorporate processing and memory resources similar to those discussed above in connection with the network device as a whole.

As can be observed from the foregoing, the multicast fast reroute system and method described herein provide numerous advantages. For example, multicast data can be rerouted without having to wait for unicast routing protocols to identify a network failure. Also, a redundant data stream is produced in the network without creating separate multicast hosts, as required in a source redundancy model. There is, therefore, no need to provision multiple sources or synchronize data streams. The system is configured to provide points that the data can be easily discarded until needed, to reduce any negative effects of wasted bandwidth and switching resources.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   receiving a multicast join message at a node, the node comprising a plurality of interfaces comprising at least two ring interfaces;
   identifying said interface at which said multicast join message was received and selecting one or more of said plurality of interfaces to transmit said multicast join message based on whether said multicast join message was received on one of said ring interfaces;
   if said multicast join message was received on one of said ring interfaces, transmitting said multicast join message on another of said interfaces;
   if said multicast join message was not received on one of said ring interfaces, transmitting said multicast join message on both of said ring interfaces;
   receiving multicast data transmitted from a source node and destined for one or more receivers; and
   transmitting said multicast data on said interface at which said multicast join message was received, wherein duplicate multicast data received from the source node is not transmitted to said one or more receivers.

2. The method of claim 1 wherein receiving said multicast data comprises receiving said multicast data from a primary path and a backup path and further comprising:
   identifying a failure in said primary path; and
   transmitting said multicast data received from said backup path to said one or more receivers.

3. The method of claim 2 wherein identifying a failure comprises changing a primary incoming interface from one of said plurality of interfaces to another of said plurality of interfaces.

4. The method of claim 2 wherein identifying a failure comprises changing a Reverse Path Forwarding (RPF) entry in a forwarding information base and an outgoing interface list.

5. The method of claim 1 wherein transmitting said multicast data comprises transmitting said multicast data only if one of said ring interfaces is a primary incoming interface and said interface on which said multicast join message was transmitted is a primary incoming interface.

6. The method of claim 1 further comprising setting at least one forward flag and at least one receive flag at said plurality of interfaces.

7. The method of claim 6 further comprising setting at least two forward flags at said plurality of interfaces.

8. The method of claim 1 further comprising setting two different receive flags and two different forward flags at said plurality of interfaces.

9. The method of claim 1 further comprising looking up a flag of a Reverse Path Forwarding (RPF) entry in a forwarding information base and selecting a primary incoming interface based on said flag setting.

10. The method of claim 1 further comprising inserting a single Reverse Path Forwarding (RPF) entry into a forwarding information base to identify primary incoming interface for one or more multicast sources and groups.

11. A method comprising:
    receiving a multicast join message at a node comprising a plurality of interfaces;
    transmitting said multicast join message to a first neighbor node;
    transmitting an alternate multicast join message to an Interior Gateway Protocol (IGP) neighbor node;

receiving multicast data from the first neighbor node and the IGP neighbor node and dropping said multicast data received from the IGP neighbor node, wherein said multicast data received from the first neighbor node is received at an interface identified as a primary incoming interface;

upon identifying a failure wherein said multicast data is no longer received from the first neighbor node, changing said primary incoming interface to said interface in communication with the IGP neighbor node; and transmitting said multicast data received at said primary incoming interface.

12. The method of claim 11 further comprising comparing an IGP metric from the IGP neighbor node to a source node with an IGP metric from the node to the source node to identify the IGP neighbor node.

13. The method of claim 11 wherein no changes are made to an outgoing interface list at the node upon changing said incoming interface at the node.

14. The method of claim 11 further comprising looking up a flag associated with a Reverse Path Forwarding (RPF) entry in a forwarding information base and selecting said incoming interface based on said flag.

15. An apparatus comprising:
a plurality of interfaces comprising at least two ring interfaces;
a processor operable to process multicast join messages and multicast data received at the node, identify said interface at which said multicast join message was received, and select one or more of said plurality of interfaces to transmit said multicast join message based on whether said multicast join message was received on one of said ring interfaces; and
a transmitter configured, if said multicast join message was received on one of said ring interfaces, to transmit said multicast join message on another of said interfaces, and if said multicast join message was not received on one of said ring interfaces, to transmit said multicast join message on both of said ring interfaces;
wherein said transmitter is further configured to transmit said multicast data on said interface at which said multicast join message was received to a receiver and wherein duplicate multicast data received from a source node is not transmitted to the receiver.

16. The apparatus of claim 15 wherein the processor is configured to receive said multicast data from a primary path and a backup path and identify a failure in said primary path, and wherein the transmitter is further configured to, upon identification of said failure, transmit said multicast data received from said backup path to the receiver.

17. The apparatus of claim 16 wherein the processor is configured, upon identifying said failure, to change a primary incoming interface from one of said plurality of interfaces to another of said plurality of interfaces.

18. The apparatus of claim 15 wherein the processor is further configured to set two different receive flags and two different forward flags at said plurality of interfaces.

19. The apparatus of claim 15 wherein the processor is further configured to insert a single Reverse Path Forwarding (RPF) entry into a forwarding information base to identify primary incoming interface for one or more multicast sources and groups.

20. An apparatus comprising:
means for receiving a multicast join message at a node comprising a plurality of interfaces;
means for transmitting said multicast join message to a first neighbor node;
means for transmitting an alternate multicast join message to an Interior Gateway Protocol (IGP)-downstream neighbor node;
means for receiving multicast data from the first neighbor node and the IGP neighbor node and dropping said multicast data received from the IGP neighbor node, wherein said multicast data received from the first neighbor node is received at an interface identified as a primary incoming interface;
means for, upon identifying a failure wherein said multicast data is no longer received from the first neighbor node, changing said primary incoming interface to said interface in communication with the IGP neighbor node; and
means for transmitting said multicast data received at said primary incoming interface.

* * * * *